US012338550B2

(12) United States Patent
Zhuang et al.

(10) Patent No.: US 12,338,550 B2
(45) Date of Patent: Jun. 24, 2025

(54) METHOD OF PREPARING ANTIBACTERIAL ANTI-YELLOWING ZnO ANTIMONY-FREE POLYESTER FIBER

(71) Applicants: XINFENGMING GROUP CO., LTD., Jiaxing (CN); DONGHUA UNIVERSITY, Shanghai (CN); SHANGHAI HUIYI NEW MATERIALS TECHNOLOGY CO., LTD., Shanghai (CN); NEW FENGMING GROUP HUZHOU ZHONGSHI TECHNOLOGY CO., LTD., Huzhou (CN); HUZHOU ZHONGYUE CHEMICAL FIBER CO., LTD., Huzhou (CN); SHAOXING HUIQUN NEW MATERIAL TECHNOLOGY CO., LTD., Shaoxing (CN); ZHEJIANG RUISHENGKE NEW MATERIALS RESEARCH INSTITUTE CO., LTD., Jiaxing (CN)

(72) Inventors: Yaozhong Zhuang, Jiaxing (CN); Bin Sun, Shanghai (CN); Weidong Zhan, Shanghai (CN); Heng Zhang, Shanghai (CN); Xingqi Hu, Huzhou (CN); Hong Shen, Huzhou (CN); Li Cui, Jiaxing (CN); Hailong Yu, Shanghai (CN)

(73) Assignees: XINFENGMING GROUP CO., LTD., Jiaxing (CN); DONGHUA UNIVERSITY, Shanghai (CN); SHANGHAI HUIYI NEW MATERIALS TECHNOLOGY CO., LTD., Shanghai (CN); NEW FENGMING GROUP HUZHOU ZHONGSHI TECHNOLOGY CO., LTD., Huzhou (CN); HUZHOU ZHONGYUE CHEMICAL FIBER CO., LTD., Huzhou (CN); SHAOXING HUIQUN NEW MATERIAL TECHNOLOGY CO., LTD., Shaoxing (CN); ZHEJIANG RUISHENGKE NEW MATERIALS RESEARCH INSTITUTE CO., LTD., Jiaxing (CN)

( * ) Notice: Subject to any disclaimer, the term of this patent is extended or adjusted under 35 U.S.C. 154(b) by 0 days.

(21) Appl. No.: 18/873,742

(22) PCT Filed: Jul. 4, 2023

(86) PCT No.: PCT/CN2023/105617
§ 371 (c)(1),
(2) Date: Dec. 11, 2024

(87) PCT Pub. No.: WO2024/008053
PCT Pub. Date: Jan. 11, 2024

(65) Prior Publication Data
US 2025/0171932 A1  May 29, 2025

(30) Foreign Application Priority Data
Jul. 5, 2022  (CN) .......................... 202210794777.4

(51) Int. Cl.
C08G 63/78 (2006.01)
A01N 25/10 (2006.01)
(Continued)

(52) U.S. Cl.
CPC ............ *D01F 1/103* (2013.01); *A01N 25/10* (2013.01); *A01N 25/34* (2013.01); *A01N 59/26* (2013.01);
(Continued)

(58) Field of Classification Search
CPC .................. C08G 63/183; C08G 63/78; C08K 2003/12296; C08K 5/52; C08K 9/04;
(Continued)

(56) References Cited

FOREIGN PATENT DOCUMENTS

| CN | 102031584 A | 4/2011 |
| CN | 102965760 A | 3/2013 |

(Continued)

OTHER PUBLICATIONS

Translation of CN 109505025 A (publishe don Mar. 22, 2019).*
(Continued)

Primary Examiner — Leo B Tentoni
(74) Attorney, Agent, or Firm — Bayramoglu Law Offices LLC

(57) ABSTRACT

A method of preparing an antibacterial anti-yellowing ZnO antimony-free polyester fiber is provided. In direct spinning of antimony-free polyester melt, an anti-yellowing nano antibacterial agent is introduced into a polymerization process of antimony-free polyester to obtain the antibacterial anti-yellowing ZnO antimony-free polyester fiber; the anti-yellowing nano antibacterial agent is a surface-deposited or coated nano ZnO of a phosphate ester small molecule having a function of resisting thermal oxidative degradation, the phosphate ester small molecule is bound to the nano ZnO by van der Waals force, hydrogen bonding or covalent bonding, and the phosphate ester small molecule is a phosphate ester molecule with a molecular weight of less than 500 Da; the content of the nano ZnO in the antibacterial anti-yellowing ZnO antimony-free polyester fiber is not lower than 1.2 wt %, and the yellowing index Yi value of the antibacterial anti-yellowing ZnO antimony-free polyester fiber is not higher than 16.1.

10 Claims, No Drawings

(51) Int. Cl.

| | |
|---|---|
| *A01N 25/34* | (2006.01) |
| *A01N 59/26* | (2006.01) |
| *A01P 1/00* | (2006.01) |
| *C08G 63/183* | (2006.01) |
| *C08K 5/52* | (2006.01) |
| *C08K 9/04* | (2006.01) |
| *D01D 1/04* | (2006.01) |
| *D01D 5/08* | (2006.01) |
| *D01D 5/088* | (2006.01) |
| *D01D 5/12* | (2006.01) |
| *D01D 5/16* | (2006.01) |
| *D01D 7/00* | (2006.01) |
| *D01F 1/10* | (2006.01) |
| *D01F 6/62* | (2006.01) |
| *D02J 1/22* | (2006.01) |

(52) U.S. Cl.
CPC .............. *A01P 1/00* (2021.08); *C08G 63/183* (2013.01); *C08K 9/04* (2013.01); *D01D 1/04* (2013.01); *D01D 5/08* (2013.01); *D01F 6/62* (2013.01); *C08K 2201/005* (2013.01); *C08K 2201/011* (2013.01); *D10B 2331/04* (2013.01); *D10B 2401/13* (2013.01)

(58) Field of Classification Search
CPC ...... C08K 2201/011; D01D 1/04; D01D 5/08; D01D 5/088; D01D 5/12; D01D 5/16; D01D 7/00; D01F 1/103; D01F 6/62; D02J 1/22; D10B 2331/04; D10B 2401/13
USPC ........ 264/210.6, 210.8, 211, 211.12, 331.21; 524/140, 141, 145, 151, 153, 783; 528/308.1, 308.3
See application file for complete search history.

(56) References Cited

FOREIGN PATENT DOCUMENTS

| | | | | |
|---|---|---|---|---|
| CN | 109505025 A | * | 3/2019 | ........... C08G 63/183 |
| CN | 111394824 A | | 7/2020 | |
| CN | 113845647 A | | 12/2021 | |
| CN | 115262019 A | | 11/2022 | |
| JP | 2004190197 A | | 7/2004 | |
| KR | 20070071774 A | | 7/2007 | |
| WO | 2021175134 A1 | | 9/2021 | |

OTHER PUBLICATIONS

FZ/T 73023-2006: Antibacterial knitwear, China National Standards, 2006, pp. 1-14, National Development and Reform Commission.

* cited by examiner

METHOD OF PREPARING ANTIBACTERIAL ANTI-YELLOWING ZnO ANTIMONY-FREE POLYESTER FIBER

CROSS REFERENCE TO THE RELATED APPLICATIONS

This application is the national phase entry of International Application No. PCT/CN2023/105617, filed on Apr. 7, 2023, which is based upon and claims priority to Chinese Patent Application No. 202210794777.4, filed on May 7, 2022, the entire contents of which are incorporated herein by reference.

TECHNICAL FIELD

The present invention belongs to the technical field of polyester fibers, and more particularly, relates to a method of preparing an antibacterial anti-yellowing ZnO antimony-free polyester fiber.

BACKGROUND

There are various bacteria and molds in the human living environment, including *Staphylococcus aureus, Escherichia coli, Pseudomonas aeruginosa, Aspergillus flavus, Candida albicans* and so on. When the human body has poor resistance, it is the culprit that endangers human health. There are also some "smelly bacteria" that multiply and reproduce by acting on metabolites such as human sweat. *Staphylococcus epidermidis* and coryneform bacteria are common in underwear and underpants. The fungi that cause odor in outerwear are generally bacillus spores and a small amount of *Staphylococcus epidermidis*. In a high temperature and high humidity environment, when these microorganisms multiply in large numbers on clothing, the fibers are easily degraded and discolored by their acidic or alkaline metabolites, and volatile malodorous substances such as acetic acid and ammonia are generated, which are also easy to cause certain diseases in the human body. Therefore, antibacterial and deodorization have always been closely related. Textiles are closely related to people's lives and are one of the media for microorganisms to directly or indirectly spread diseases. In order to meet people's requirements for the hygienic functions of textiles, antibacterial and deodorization of fiber products are very necessary. The consumption of polyester fiber in clothing accounts for the largest proportion among various synthetic fibers, and research and development on the antibacterial function of polyester fiber materials is endless.

Nano zinc oxide has a strong bactericidal and antibacterial function, and its killing rate for *Escherichia coli, Staphylococcus aureus, Pseudomonas aeruginosa* and other bacteria is as high as 99%. Adding a certain amount of zinc oxide to polymer fiber materials has good bactericidal and antibacterial functions. However, the strong interface effect produced by the high specific surface area of nanoparticles makes it easy to condense and difficult to preserve and stably disperse in the polymer. In addition, in order to achieve the ideal antibacterial and deodorizing effect, it is often necessary to add a high content ($\geq 2$ wt %) of nano ZnO, which will have a strong catalytic degradation effect on the polyester matrix, especially the polyester matrix produced by titanium catalysts. The prepared polyester fibers often have yellowing problems, which limits the application of its products. In order to avoid the yellowing problem, the addition amount can be reduced, but the antibacterial performance of nano zinc oxide below 1 wt % is poor, and it is necessary to improve the antibacterial performance by compounding other components of antibacterial agents. CN 102031584 A discloses a method for preparing a nano zinc oxide and titanium dioxide composite antibacterial polyester fiber. The antibacterial and deodorizing polyester fiber prepared by the technical solution disclosed in CN 102965760 A utilizes zinc oxide whiskers and silver-based antibacterial agents to form a broad-spectrum antibacterial agent. The preparation method of the composite antibacterial agent is complex, and the amount of inorganic filler added is high, which seriously affects the spinnability and basic physical properties of the fiber.

The melt spinning process has the advantages of scale benefits and low cost, and has become the main process route for polyester fiber production. In the melt spinning process, functional powders can be introduced during spinning (i.e. melt spinning online addition process) or during polyester synthesis (i.e. melt spinning in-situ addition process). However, the existing technology can only use the melt spinning online addition process to prepare antibacterial ZnO polyester fibers, and it is difficult to use the melt spinning in-situ addition process to prepare antibacterial ZnO polyester fibers. This is because the high temperature transmission distance is long during the melt spinning process, and the premature addition of ZnO will affect the viscosity of the polyester matrix and cause yellowing.

Therefore, it is of great significance to study a ZnO that will not cause yellowing of polyester fibers when added in high amounts and process it into antibacterial ZnO polyester fibers through a melt-spinning in-situ addition process with polyester raw materials.

SUMMARY

In view of the problems existing in the prior art, the present invention provides a method of preparing an antibacterial anti-yellowing ZnO antimony-free polyester fiber. The present invention avoids the yellowing of the fiber caused by excessive addition of nano ZnO by depositing or coating phosphate ester small molecules with anti-thermal oxidative degradation function on the surface of nano ZnO, so that the nano ZnO can be added to the fiber in a relatively high addition amount, and the excellent antibacterial and deodorizing performance of the nano ZnO can be fully exerted in the fiber. At the same time, the coated phosphate ester nano ZnO in the present invention is directly added in the esterification stage. Since the phosphate ester is coated on the ZnO surface in the form of van der Waals force, hydrogen bond or covalent bond, the degradation effect of ZnO on the polyester melt is greatly reduced, making a long-distance melt direct spinning process possible.

To this end, the technical schemes of the invention are as follows:

A method of preparing an antibacterial anti-yellowing ZnO antimony-free polyester fiber, in which an anti-yellowing nano antibacterial agent is introduced (the specific introduction method is not limited, as long as the introduction method that can bring the anti-yellowing nano antibacterial agent into the antimony-free polyester is applicable to the present invention) into the polymerization process of antimony-free polyester (i.e. polyester that does not contain antimony element, the present invention uses titanium catalyst-based antimony-free polyester, i.e. polyester prepared by using titanium catalyst) during the direct spinning process of antimony-free polyester melt to prepare the antibacterial anti-yellowing ZnO antimony-free polyester fiber;

The anti-yellowing nano antibacterial agent is a nano ZnO with a phosphate ester small molecule deposited or coated on the surface and having a function of resisting thermal oxidative degradation. The phosphate ester small molecule is bonded to the nano ZnO through van der Waals force, hydrogen bond or covalent bond. The phosphate ester small molecule is a phosphate ester molecule with a molecular weight of less than 500 Da. In the present invention, since the phosphate ester small molecule is smaller in volume than the nano ZnO, after bonding with the nano ZnO, the phosphate ester small molecule is anchored on the nano ZnO, and the phosphate ester small molecule is not easy to migrate in the polyester. In addition, after bonding with the nano ZnO, the phosphate ester small molecule is also conducive to improving the dispersion uniformity of the nano ZnO in the polyester.

The content of nano ZnO in the antibacterial anti-yellowing ZnO antimony-free polyester fiber is not less than 1.2 wt %, and the yellowing index Yi value of the antibacterial anti-yellowing ZnO antimony-free polyester fiber is not higher than 16.1.

The following preferred technology program is presented to give a detailed description for this invention:

The said method of preparing an antibacterial anti-yellowing ZnO antimony-free polyester fiber, wherein the phosphate ester small molecule with the function of resisting thermal oxidative degradation is one or more of triethyl phosphate, phosphoric acid, triphenyl phosphate, trimethyl phosphate and triphenyl phosphite. The mechanism of action of the phosphate ester small molecule with the function of resisting thermal oxidative degradation is: reacting with the metal oxide that promotes thermal degradation to generate metal phosphate ester compounds, that is, inhibiting the activity of the metal oxide to thermal oxidative degradation. In addition, phosphate ester is a hydrogen peroxide decomposition agent generated during thermal oxidative degradation. The phosphorus atom forms three P—O with three oxygen atoms connected to the benzene ring. The electron cloud around the phosphorus atom is seriously biased towards the oxygen atom. Because the phosphorus atom has a lone pair of electrons, it is easy to form a relatively stable compound with the oxygen atom of the unstable peroxide to interrupt the decomposition of the peroxide into active free radicals, thereby preventing the occurrence of a chain reaction.

The said method of preparing an antibacterial anti-yellowing ZnO antimony-free polyester fiber, wherein the average particle size of the nano ZnO is 0.4-0.8 µm. When the average particle size of the nano ZnO is too small, even a few times larger than the mean square gyration radius of the phosphate ester small molecules, the nano ZnO will be pulled by the phosphate ester small molecules to migrate and cannot anchor the phosphate ester small molecules; when the average particle size of the nano ZnO is too large, it will greatly increase the difficulty of uniform dispersion.

The said method of preparing an antibacterial anti-yellowing ZnO antimony-free polyester fiber, including the following steps of preparing an anti-yellowing nano antibacterial agent: dispersing nano ZnO in a solvent (anhydrous ethanol), adding small phosphate molecules having a function of resisting thermal oxidative degradation thereto at a temperature of 50-90° C., adjusting the pH value of the system to 4-5, preserving, cooling, refluxing, and stirring to react for 30-90 minutes, cooling to room temperature, and then filtering, washing (using anhydrous ethanol and deionized water for 2-5 times respectively) and drying (110° C., 10-12 hours) to obtain an anti-yellowing nano antibacterial agent; the content of nano ZnO in the system is 1-5 wt %, and the content of small phosphate molecules having a function of resisting thermal oxidative degradation is 1-6 wt %.

The said method of preparing an antibacterial anti-yellowing ZnO antimony-free polyester fiber, including the following steps: before introduction, the anti-yellowing nano antibacterial agent and polyethylene wax (polyethylene wax is used as an anti-sticking agent and lubricant when blended with polymer materials) are reacted in a closed mixer at a temperature of 60-70° C. for 45-60 minutes in a weight ratio of (6-10):(1.5-2) to obtain an anti-yellowing composite nano antibacterial agent.

The said method of preparing an antibacterial anti-yellowing ZnO antimony-free polyester fiber, including the following steps: firstly, mixing the anti-yellowing composite nano antibacterial agent, sodium hexametaphosphate and ethylene glycol in a weight ratio of (4-8):(0.1-0.5):(3-5), ultrasonically dispersing the mixture at a temperature of 50-60° C. for 2-3 h to obtain functionalized ethylene glycol, and then adding the functionalized ethylene glycol when the esterification rate of the antimony-free polyester polymerization reaches 85-90% (the catalyst used in the polymerization of polyethylene terephthalate is a titanium-based catalyst), wherein the weight ratio of the functionalized ethylene glycol to terephthalic acid (one of the reaction raw materials of polyethylene terephthalate) is 35:65.

The said method of preparing an antibacterial anti-yellowing ZnO antimony-free polyester fiber, the process parameters of the antimony-free polyester melt direct spinning are: spinning temperature 270-295° C., spinneret hole number 12-48 holes, cooling temperature 20-25° C., network pressure 0.25-0.40 MPa, first roller speed 800-1000 m/min, first roller temperature 80-95° C., second roller speed 1300-2700 m/min, second roller temperature 125-140° C., winding speed 1220-2600 m/min.

The said method of preparing an antibacterial anti-yellowing ZnO antimony-free polyester fiber, the antibacterial anti-yellowing ZnO antimony-free polyester fiber has an ammonia removal rate greater than or equal to 92% after being placed in an environment with an ammonia concentration of 100 ppm for 2 hours; the antibacterial anti-yellowing ZnO antimony-free polyester fiber has an antibacterial rate against *Escherichia coli* greater than or equal to 89%, an antibacterial rate against *Staphylococcus aureus* greater than or equal to 99%, and an antibacterial rate against *Candida albicans* greater than or equal to 96%; the breaking strength of the antibacterial anti-yellowing ZnO antimony-free polyester fiber is 3.5-3.7 cN/dtex, and the elongation at break is 12.07-13.58%.

Benefits (1) The present invention provides a method of preparing an antibacterial anti-yellowing ZnO antimony-free polyester fiber, includes compounding nano zinc oxide with a phosphate ester small molecule having a thermal oxidative degradation resistance function to obtain an anti-yellowing nano antibacterial agent, and directly spinning the anti-yellowing nano antibacterial agent into an anti-yellowing, antibacterial, deodorant antimony-free polyester fiber having a zinc oxide content of 1.5 wt %. The method is simple and has a wide range of applications.

(2) The antibacterial anti-yellowing ZnO antimony-free polyester fiber prepared by method of preparing an antibacterial anti-yellowing ZnO antimony-free polyester fiber of the present invention has excellent antibacterial and deodorizing functions, does not yellow, has good strength, and is resistant to washing. The antibacterial anti-yellowing ZnO antimony-free polyester fiber has a breaking strength of 3.5-3.7 cN/dtex and a breaking elongation of 12.07-13.58%. It also has the excellent processing performance and use performance of ordinary synthetic fibers, and does not contain heavy metal antimony that is harmful to the human body. It can be widely used in clothing, carpets, curtains, bedding, car seat cushions, hospitals, etc.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

The invention adopts the Japanese SEK fiber product deodorization detection tube method to test the ammonia removal rate of the antibacterial anti-yellowing ZnO antimony-free polyester fiber.

The invention is based on the FZ/T 73023-2006 antibacterial detection standard, and adopts the D8 oscillation method and the E halo method to carry out antibacterial test on the antibacterial anti-yellowing ZnO antimony-free polyester fiber.

The mechanical properties of the fiber of the present invention are tested on a multifilament strength tester with a clamping distance of 250 mm, a pre-tension of 50 cN, and a tensile rate of 500 mm/min.

Example 1

A method of preparing an antibacterial anti-yellowing ZnO antimony-free polyester fiber, the specific steps are as follows:

(1) Preparation of Anti-Yellowing Nano Antibacterial Agent;

After dispersing nano ZnO with an average particle size of 0.4 μm in a solvent (anhydrous ethanol), a phosphate ester small molecule (triethyl phosphate) with a function of resisting thermal oxidative degradation was added thereto at a temperature of 50° C., the pH value of the system was adjusted to 4, the system was kept warm, cooled, refluxed and stirred for 90 minutes, and then cooled to 23° C., and then filtered, washed (washed twice with anhydrous ethanol and deionized water respectively) and dried (110° C., 10 h) to obtain an anti-yellowing nano antibacterial agent; the content of nano ZnO in the system was 2 wt %, and the content of the phosphate ester small molecule with a function of resisting thermal oxidative degradation was 1 wt %;

The prepared anti-yellowing nano antibacterial agent is nano ZnO with phosphate ester small molecules having the function of resisting thermal oxidative degradation deposited or coated on the surface, and the phosphate ester small molecules and the nano ZnO are bonded by van der Waals force, hydrogen bond or covalent bond;

(2) The Anti-Yellowing Nano Antibacterial Agent Prepared in Step (1) and Polyethylene Wax were Reacted in a Closed Mixer at a Temperature of 60° C. with Stirring for 60 Minutes to Prepare an Anti-Yellowing Composite Nano Antibacterial Agent in a Weight Ratio of 6:1.5;

(3) Spinning;

The anti-yellowing composite nano antibacterial agent obtained in step (2), sodium hexametaphosphate and ethylene glycol are mixed in a weight ratio of 4:0.1:3, and ultrasonically dispersed at a temperature of 50° C. for 3 hours to obtain functionalized ethylene glycol. When the esterification rate of antimony-free polyester polymerization reaches 85% (the catalyst used in the polymerization of polyethylene terephthalate is a titanium catalyst), the functionalized ethylene glycol is added thereto and melt-spun to obtain antibacterial anti-yellowing ZnO antimony-free polyester fibers, wherein the weight ratio of the functionalized ethylene glycol to the synthetic raw material terephthalic acid of the antimony-free polyester is 35:65;

The process parameters of melt direct spinning are: spinning temperature 293° C., spinneret hole number 12 holes, cooling temperature 25° C., network pressure 0.40 MPa, first roller speed 1000 m/min, first roller temperature 95° C., second roller speed 2100 m/min, second roller temperature 125° C., winding speed 2050 m/min.

The content of nano ZnO in the prepared antibacterial anti-yellowing ZnO antimony-free polyester fiber is 1.2 wt %; the removal rate of ammonia by the antibacterial anti-yellowing ZnO antimony-free polyester fiber is 92% after being placed in an environment with an ammonia concentration of 100 ppm for 2 hours; the antibacterial rate of the antibacterial anti-yellowing ZnO antimony-free polyester fiber against *Escherichia coli* is 89%, the antibacterial rate against *Staphylococcus aureus* is 99%, and the antibacterial rate against *Candida albicans* is 96%; the breaking strength of the antibacterial anti-yellowing ZnO antimony-free polyester fiber is 3.5 cN/dtex, and the elongation at break is 12.07%.

Comparison 1

A method of preparing polyester fibers is basically the same as that of Example 1, except that ZnO is not added in step (1) of Example 1.

The polyester fiber prepared in Comparison 1 and the polyester fiber prepared in Example 1 were placed in a 170° C. forced air oven for thermal oxidation for 2 h, and the chromaticity (L, a, b values) after treatment was measured using an automatic colorimeter. The yellowing index was calculated according to the formula: $Yi=\sqrt{(100-L)^2+a^2+b^2}$, when L is 100, a and b are both 0, Yi is 0, indicating no color change; the larger the Yi value, the greater the color change, which means that the yellowing is enhanced; the experiment found that the Yi value of the polyester fiber prepared in Comparison 1 is 37.8, and the Yi value of the polyester fiber prepared in Example 1 drops to 16.1. This excellent anti-yellowing performance is related to the added antibacterial and anti-yellowing nano ZnO. The specific data are shown in Table 1.

TABLE 1

| Sample | L | a | b | Yi |
|---|---|---|---|---|
| Comparison 1 | 70.7 | 16.6 | 17.2 | 37.8 |
| Example 1 | 94.2 | 14.2 | 4.8 | 16.1 |

Example 2

A method of preparing an antibacterial anti-yellowing ZnO antimony-free polyester fiber, the specific steps are as follows:
(1) Preparation of Anti-Yellowing Nano Antibacterial Agent;
After dispersing nano ZnO with an average particle size of 0.5 μm in a solvent (anhydrous ethanol), adding a phosphate ester small molecule (phosphoric acid) with a function of resisting thermal oxidative degradation at 60° C., adjusting the pH value of the system to 4, keeping the temperature, cooling, refluxing, and stirring to react for 80 minutes, cooling to 24° C., and then filtering, washing (using anhydrous ethanol and deionized water for 3 times respectively) and drying (110° C., 10 h) to obtain an anti-yellowing nano antibacterial agent; the content of nano ZnO in the system is 2.5 wt %, and the content of the phosphate ester small molecule with a function of resisting thermal oxidative degradation is 2 wt %;
The prepared anti-yellowing nano antibacterial agent is nano ZnO with phosphate ester small molecules having the function of resisting thermal oxidative degradation deposited or coated on the surface, and the phosphate ester small molecules and the nano ZnO are bonded by van der Waals force, hydrogen bond or covalent bond;
(2) the anti-yellowing nano antibacterial agent prepared in step (1) and polyethylene wax were stirred in a closed mixer at a temperature of 62° C. for 58 minutes to prepare an anti-yellowing composite nano antibacterial agent in a weight ratio of 6:2;
(3) Spinning;
The anti-yellowing composite nano antibacterial agent obtained in step (2), sodium hexametaphosphate and ethylene glycol are mixed in a weight ratio of 5:0.2:4, and ultrasonically dispersed at a temperature of 54° C. for 2.8 hours to obtain functionalized ethylene glycol. When the esterification rate of antimony-free polyester polymerization reaches 86% (the catalyst used in the polymerization of polyethylene terephthalate is a titanium catalyst), the functionalized ethylene glycol is added thereto and melt-spun to obtain antibacterial anti-yellowing ZnO antimony-free polyester fibers, wherein the weight ratio of the functionalized ethylene glycol to the synthetic raw material terephthalic acid of the antimony-free polyester is 35:65;

The process parameters of melt direct spinning are: spinning temperature 290° C., spinneret hole number 24 holes, cooling temperature 25° C., network pressure 0.35 MPa, first roller speed 950 m/min, first roller temperature 92° C., second roller speed 2000 m/min, second roller temperature 125° C., winding speed 1950 m/min.

The content of nano ZnO in the prepared antibacterial anti-yellowing ZnO antimony-free polyester fiber is 1.5 wt %, and the yellowing index Yi value of the antibacterial anti-yellowing ZnO antimony-free polyester fiber is 16.1; the removal rate of ammonia by the antibacterial anti-yellowing ZnO antimony-free polyester fiber is 93% after being placed in an environment with an ammonia concentration of 100 ppm for 2 hours; the antibacterial rate of the antibacterial anti-yellowing ZnO antimony-free polyester fiber against *Escherichia coli* is 90%, the antibacterial rate against *Staphylococcus aureus* is 99.1%, and the antibacterial rate against *Candida albicans* is 96%; the breaking strength of the antibacterial anti-yellowing ZnO antimony-free polyester fiber is 3.6 cN/dtex, and the elongation at break is 13%.

Example 3

A method of preparing an antibacterial anti-yellowing ZnO antimony-free polyester fiber, the specific steps are as follows:
(1) Preparation of Anti-Yellowing Nano Antibacterial Agent;
After dispersing nano ZnO with an average particle size of 0.6 μm in a solvent (anhydrous ethanol), a phosphate ester small molecule (triphenyl phosphate) with a function of resisting thermal oxidative degradation was added thereto at a temperature of 70° C., the pH value of the system was adjusted to 4, the mixture was kept warm, refluxed and stirred for 70 minutes, and then cooled to 25° C., and then filtered, washed (washed 4 times with anhydrous ethanol and deionized water respectively) and dried (110° C., 11 h) to obtain an anti-yellowing nano antibacterial agent; the content of nano ZnO in the system was 2.5 wt %, and the content of the phosphate ester small molecule with a function of resisting thermal oxidative degradation was 3 wt %;
The prepared anti-yellowing nano antibacterial agent is nano ZnO with phosphate ester small molecules having the function of resisting thermal oxidative degradation deposited or coated on the surface, and the phosphate ester small molecules and the nano ZnO are bonded by van der Waals force, hydrogen bond or covalent bond;
(2) the anti-yellowing nano antibacterial agent prepared in step (1) and polyethylene wax were stirred in a closed mixer at a temperature of 64° C. for 56 minutes to prepare an anti-yellowing composite nano antibacterial agent in a weight ratio of 7:1.5;
(3) Spinning;
The anti-yellowing composite nano antibacterial agent obtained in step (2), sodium hexametaphosphate and ethylene glycol are mixed in a weight ratio of 6:0.3:5, and ultrasonically dispersed at a temperature of 57° C. for 2.5 hours to obtain functionalized ethylene glycol. When the esterification rate of antimony-free polyester polymerization reaches 88% (the catalyst used in the polymerization of polyethylene terephthalate is a titanium catalyst), the functionalized ethylene glycol is added thereto and melt-spun to obtain antibacterial anti-yellowing ZnO antimony-free polyester fibers, wherein the weight ratio of the functionalized ethylene glycol to the synthetic raw material terephthalic acid of the antimony-free polyester is 35:65;

The process parameters of melt direct spinning are: spinning temperature 287° C., spinneret hole number 36 holes, cooling temperature 22° C., network pressure 0.30 MPa, first roller speed 900 m/min, first roller temperature 89° C., second roller speed 1800 m/min, second roller temperature 130° C., winding speed 1750 m/min.

The content of nano ZnO in the prepared antibacterial anti-yellowing ZnO antimony-free polyester fiber is 1.5 wt %, and the yellowing index Yi value of the antibacterial anti-yellowing ZnO antimony-free polyester fiber is 16; the removal rate of ammonia by the antibacterial anti-yellowing ZnO antimony-free polyester fiber is 92.5% after being placed in an environment with an ammonia concentration of 100 ppm for 2 hours; the antibacterial rate of the antibacterial anti-yellowing ZnO antimony-free polyester fiber against *Escherichia coli* is 90.5%, the antibacterial rate against *Staphylococcus aureus* is 99.2%, and the antibacterial rate against *Candida albicans* is 97%; the breaking strength of the antibacterial anti-yellowing ZnO antimony-free polyester fiber is 3.55 cN/dtex, and the elongation at break is 12.4%.

Example 4

A method of preparing an antibacterial anti-yellowing ZnO antimony-free polyester fiber, the specific steps are as follows:
(1) Preparation of Anti-Yellowing Nano Antibacterial Agent;
After dispersing nano ZnO with an average particle size of 0.7 μm in a solvent (anhydrous ethanol), a phosphate ester small molecule (trimethyl phosphate) with a function of resisting thermal oxidative degradation was added thereto at a temperature of 80° C., the pH value of the system was adjusted to 5, the mixture was kept warm, refluxed and stirred for 60 minutes, and then cooled to 26° C., and then filtered, washed (washed with anhydrous ethanol and deionized water for 5 times respectively) and dried (110° C., 11 h) to obtain an anti-yellowing nano antibacterial agent; the content of nano ZnO in the system was 2.5 wt %, and the content of phosphate ester small molecules with a function of resisting thermal oxidative degradation was 4 wt %;
The prepared anti-yellowing nano antibacterial agent is nano ZnO with phosphate ester small molecules having the function of resisting thermal oxidative degradation deposited or coated on the surface, and the phosphate ester small molecules and the nano ZnO are bonded by van der Waals force, hydrogen bond or covalent bond;
(2) the anti-yellowing nano antibacterial agent prepared in step (1) and polyethylene wax were stirred in a closed mixer at a temperature of 66° C. for 54 minutes in a weight ratio of 7:2 to prepare an anti-yellowing composite nano antibacterial agent;
(3) Spinning;
The anti-yellowing composite nano antibacterial agent obtained in step (2), sodium hexametaphosphate and ethylene glycol are mixed in a weight ratio of 8:0.4:5, and ultrasonically dispersed at 60° C. for 2 h to obtain functionalized ethylene glycol. When the esterification rate of antimony-free polyester polymerization reaches 90% (the catalyst used in the polymerization of polyethylene terephthalate is a titanium catalyst), the functionalized ethylene glycol is added thereto and melt-spun to obtain antibacterial anti-yellowing ZnO antimony-free polyester fibers, wherein the weight ratio of the functionalized ethylene glycol to the synthetic raw material terephthalic acid of the antimony-free polyester is 35:65;
The process parameters of melt direct spinning are: spinning temperature 284° C., spinneret hole number 48 holes, cooling temperature 22° C., network pressure 0.25 MPa, first roller speed 850 m/min, first roller temperature 86° C., second roller speed 1700 m/min, second roller temperature 130° C., winding speed 1650 m/min.

The content of nano ZnO in the prepared antibacterial anti-yellowing ZnO antimony-free polyester fiber is 1.5 wt %, and the yellowing index Yi value of the antibacterial anti-yellowing ZnO antimony-free polyester fiber is 15.9; the removal rate of ammonia by the antibacterial anti-yellowing ZnO antimony-free polyester fiber is 94% after being placed in an environment with an ammonia concentration of 100 ppm for 2 hours; the antibacterial rate of the antibacterial anti-yellowing ZnO antimony-free polyester fiber against *Escherichia coli* is 89.5%, the antibacterial rate against *Staphylococcus aureus* is 99.2%, and the antibacterial rate against *Candida albicans* is 96.1%; the breaking strength of the antibacterial anti-yellowing ZnO antimony-free polyester fiber is 3.5 cN/dtex, and the elongation at break is 12.35%.

Example 5

A method of preparing an antibacterial anti-yellowing ZnO antimony-free polyester fiber, the specific steps are as follows:
(1) Preparation of Anti-Yellowing Nano Antibacterial Agent;
After dispersing nano ZnO with an average particle size of 0.8 μm in a solvent (anhydrous ethanol), a phosphate ester small molecule (triphenyl phosphite) with a function of resisting thermal oxidative degradation was added thereto at a temperature of 90° C., the pH value of the system was adjusted to 5, the mixture was kept warm, refluxed and stirred for 50 minutes, then cooled to 27° C., filtered, washed (washed twice with anhydrous ethanol and deionized water respectively) and dried (110° C., 12 h) to obtain an anti-yellowing nano antibacterial agent; the content of nano ZnO in the system was 2 wt %, and the content of the phosphate ester small molecule with a function of resisting thermal oxidative degradation was 5 wt %;
The prepared anti-yellowing nano antibacterial agent is nano ZnO with phosphate ester small molecules having the function of resisting thermal oxidative degradation deposited or coated on the surface, and the phosphate ester small molecules and the nano ZnO are bonded by van der Waals force, hydrogen bond or covalent bond;
(2) the anti-yellowing nano antibacterial agent prepared in step (1) and polyethylene wax were stirred in a closed mixer at a temperature of 68° C. for 52 minutes to prepare an anti-yellowing composite nano antibacterial agent in a weight ratio of 8:1.5;
(3) Spinning;
The anti-yellowing composite nano antibacterial agent obtained in step (2), sodium hexametaphosphate and ethylene glycol are mixed in a weight ratio of 5:0.2:4, and ultrasonically dispersed at a temperature of 54° C. for 2.8 hours to obtain functionalized ethylene glycol. When the esterification rate of antimony-free polyester polymerization reaches 86% (the catalyst used in the polymerization of polyethylene terephthalate is a titanium catalyst), the functionalized ethylene glycol is added thereto and melt-spun to obtain antibacterial anti-yellowing ZnO antimony-free polyester fibers, wherein the weight ratio of the functionalized ethylene glycol to the synthetic raw material terephthalic acid of the antimony-free polyester is 35:65;
The process parameters of melt direct spinning are: spinning temperature 281° C., spinneret hole number 36 holes, cooling temperature 22° C., network pressure 0.30 MPa, first roller speed 950 m/min, first roller temperature 90° C., second roller speed 1900 m/min, second roller temperature 135° C., winding speed 1850 m/min.

The content of nano ZnO in the prepared antibacterial anti-yellowing ZnO antimony-free polyester fiber is 1.2 wt %, and the yellowing index Yi value of the antibacterial anti-yellowing ZnO antimony-free polyester fiber is 16.1; the removal rate of ammonia by the antibacterial anti-yellowing ZnO antimony-free polyester fiber is 93% after being placed in an environment with an ammonia concentration of 100 ppm for 2 hours; the antibacterial rate of the antibacterial anti-yellowing ZnO antimony-free polyester fiber against *Escherichia coli* is 91%, the antibacterial rate against *Staphylococcus aureus* is 99.1%, and the antibacterial rate against *Candida albicans* is 97.5%; the breaking strength of the antibacterial anti-yellowing ZnO antimony-free polyester fiber is 3.6 cN/dtex, and the elongation at break is 13.58%.

Example 6

A method of preparing an antibacterial anti-yellowing ZnO antimony-free polyester fiber, the specific steps are as follows:
(1) Preparation of Anti-Yellowing Nano Antibacterial Agent;
After dispersing nano ZnO with an average particle size of 0.4 μm in a solvent (anhydrous ethanol), a phosphate ester small molecule (triphenyl phosphite) with a function of resisting thermal oxidative degradation was added thereto at a temperature of 55° C., the pH value of the system was adjusted to 5, the system was kept warm, cooled, refluxed and stirred for 40 minutes, and then cooled to 24° C., and then filtered, washed (washed with anhydrous ethanol and deionized water for 3 times respectively) and dried (110° C., 12 h) to obtain an anti-yellowing nano antibacterial agent; the content of nano ZnO in the system was 2 wt %, and the content of the phosphate ester small molecule with a function of resisting thermal oxidative degradation was 6 wt %;
The prepared anti-yellowing nano antibacterial agent is nano ZnO with phosphate ester small molecules having the function of resisting thermal oxidative degradation deposited or coated on the surface, and the phosphate ester small molecules and the nano ZnO are bonded by van der Waals force, hydrogen bond or covalent bond;
(2) the anti-yellowing nano antibacterial agent prepared in step (1) and polyethylene wax were reacted in a closed mixer at a temperature of 69° C. with stirring for 48 minutes in a weight ratio of 8:2 to prepare an anti-yellowing composite nano antibacterial agent;
(3) Spinning;
The anti-yellowing composite nano antibacterial agent obtained in step (2), sodium hexametaphosphate and ethylene glycol are mixed in a weight ratio of 6:0.3:5, and ultrasonically dispersed at a temperature of 57° C. for 2.5 hours to obtain functionalized ethylene glycol. When the esterification rate of antimony-free polyester polymerization reaches 86% (the catalyst used in the polymerization of polyethylene terephthalate is a titanium catalyst), the functionalized ethylene glycol is added thereto and melt-spun to obtain antibacterial anti-yellowing ZnO antimony-free polyester fibers, wherein the weight ratio of the functionalized ethylene glycol to the synthetic raw material terephthalic acid of the antimony-free polyester is 35:65;
The process parameters of melt direct spinning are: spinning temperature 278° C., spinneret hole number 48 holes, cooling temperature 20° C., network pressure 0.25 MPa, first roller speed 900 m/min, first roller temperature 87° C., second roller speed 1700 m/min, second roller temperature 135° C., winding speed 1650 m/min.

The content of nano ZnO in the prepared antibacterial anti-yellowing ZnO antimony-free polyester fiber is 1.2 wt %, and the yellowing index Yi value of the antibacterial anti-yellowing ZnO antimony-free polyester fiber is 15.8; the removal rate of ammonia by the antibacterial anti-yellowing ZnO antimony-free polyester fiber is 93.5% after being placed in an environment with an ammonia concentration of 100 ppm for 2 hours; the antibacterial rate of the antibacterial anti-yellowing ZnO antimony-free polyester fiber against *Escherichia coli* is 90%, the antibacterial rate against *Staphylococcus aureus* is 99.3%, and the antibacterial rate against *Candida albicans* is 96.6%; the breaking strength of the antibacterial anti-yellowing ZnO antimony-free polyester fiber is 3.7 cN/dtex, and the elongation at break is 12.63%.

Example 7

A method of preparing an antibacterial anti-yellowing ZnO antimony-free polyester fiber, the specific steps are as follows:
(1) Preparation of Anti-Yellowing Nano Antibacterial Agent;
After dispersing nano ZnO with an average particle size of 0.5 μm in a solvent (anhydrous ethanol), a phosphate ester small molecule with a function of resisting thermal oxidative degradation (a mixture of triethyl phosphate and phosphoric acid with a mass ratio of 1:1) was added thereto at a temperature of 75° C., the pH value of the system was adjusted to 5, the mixture was kept warm and refluxed and stirred for 30 minutes, then cooled to 25° C., filtered, washed (washed with anhydrous ethanol and deionized water for 4 times respectively) and dried (110° C., 12 h) to obtain an anti-yellowing nano antibacterial agent; the content of nano ZnO in the system was 2 wt %, and the content of phosphate ester small molecules with a function of resisting thermal oxidative degradation was 4 wt %;
The prepared anti-yellowing nano antibacterial agent is nano ZnO with phosphate ester small molecules having the function of resisting thermal oxidative degradation deposited or coated on the surface, and the phosphate ester small molecules and the nano ZnO are bonded by van der Waals force, hydrogen bond or covalent bond;
(2) the anti-yellowing nano antibacterial agent prepared in step (1) and polyethylene wax were stirred in a closed mixer at a temperature of 70° C. for 45 minutes to prepare an anti-yellowing composite nano antibacterial agent in a weight ratio of 10:1.5;
(3) Spinning;
The anti-yellowing composite nano antibacterial agent obtained in step (2), sodium hexametaphosphate and ethylene glycol are mixed in a weight ratio of 8:0.4:5, and then ultrasonically dispersed at 60° C. for 2 h to obtain functionalized ethylene glycol. When the esterification rate of antimony-free polyester polymerization reaches 90% (the catalyst used in the polymerization of polyethylene terephthalate is a titanium catalyst), the functionalized ethylene glycol is added thereto and melt-spun to obtain antibacterial anti-yellowing ZnO antimony-free polyester fibers, wherein the weight ratio of the functionalized ethylene glycol to the synthetic raw material terephthalic acid of the antimony-free polyester is 35:65;
The process parameters of melt direct spinning are: spinning temperature 275° C., spinneret hole number 24 holes, cooling temperature 20° C., network pressure 0.35 MPa, first roller speed 1000 m/min, first roller temperature 93° C., second roller speed 1900 m/min, second roller temperature 140° C., winding speed 1850 m/min.

The content of nano ZnO in the prepared antibacterial anti-yellowing ZnO antimony-free polyester fiber is 1.2 wt %, and the yellowing index Yi value of the antibacterial anti-yellowing ZnO antimony-free polyester fiber is 15.5; the removal rate of ammonia by the antibacterial anti-yellowing ZnO antimony-free polyester fiber is 92% after being placed in an environment with an ammonia concentration of 100 ppm for 2 hours; the antibacterial rate of the antibacterial anti-yellowing ZnO antimony-free polyester fiber against *Escherichia coli* is 89.5%, the antibacterial rate against *Staphylococcus aureus* is 99.2%, and the antibacterial rate against *Candida albicans* is 96.1%; the breaking strength of the antibacterial anti-yellowing ZnO antimony-free polyester fiber is 3.65 cN/dtex, and the elongation at break is 13.57%.

What is claimed is:

1. A method of preparing an antibacterial anti-yellowing ZnO antimony-free polyester fiber, comprising, in a process of direct spinning of an antimony-free polyester melt, introducing an anti-yellowing nano antibacterial agent into a polymerization process of an antimony-free polyester to obtain the antibacterial anti-yellowing ZnO antimony-free polyester fiber;
wherein the anti-yellowing nano antibacterial agent is a surface-deposited or coated nano ZnO of a phosphate ester small molecule having a thermal oxidative degradation resistance function, the phosphate ester small molecule is bound to nano ZnO by van der Waals force, hydrogen bonding, or covalent bonding, and the phosphate ester small molecule is a phosphate ester molecule with a molecular weight of less than 500 Da;
wherein a content of the nano ZnO in the antibacterial anti-yellowing ZnO antimony-free polyester fiber is equal to or more than 1.2 wt %, and a yellowing index Yi value of the antibacterial anti-yellowing ZnO antimony-free polyester fiber is equal to or less than 16.1.

2. The method of preparing the antibacterial anti-yellowing ZnO antimony-free polyester fiber of claim 1, wherein the phosphate ester small molecule with the thermal oxidative degradation resistance function is one or more of triethyl phosphate, phosphoric acid, triphenyl phosphate, trimethyl phosphate, and triphenyl phosphite.

3. The method of preparing the antibacterial anti-yellowing ZnO antimony-free polyester fiber of claim 1, wherein an average particle size of the nano ZnO is 0.4-0.8 µm.

4. The method of preparing the antibacterial anti-yellowing ZnO antimony-free polyester fiber according to claim 1, wherein a preparation process of the anti-yellowing nano antibacterial agent is as follows: after dispersing the nano ZnO in a solvent, adding the phosphate ester small molecule with the thermal oxidative degradation resistance function to a solvent with dispersed nano ZnO at a temperature of 50-90° C., adjusting a pH value of a system to 4-5, keeping warm, cooling, refluxing, and stirring to react for 30-90 minutes, then cooling to room temperature, and then filtering, washing, and drying to obtain the anti-yellowing nano antibacterial agent; a content of the nano ZnO in the system is 1-5 wt %, and a content of the phosphate ester small molecule with the thermal oxidative degradation resistance function in the system is 1-6 wt %.

5. The method of preparing the antibacterial anti-yellowing ZnO antimony-free polyester fiber of claim 1, wherein before an introduction, the anti-yellowing nano antibacterial agent and a polyethylene wax are reacted in a closed stirring reaction in a mixer at a temperature of 60-70° C. for 45-60 minutes at a weight ratio of (6-10):(1.5-2) to obtain an anti-yellowing composite nano antibacterial agent.

6. The method of preparing the antibacterial anti-yellowing ZnO antimony-free polyester fiber of claim 5, wherein an introduction process is: first, the anti-yellowing composite nano antibacterial agent, sodium hexametaphosphate, and ethylene glycol are mixed in a weight ratio of (4-8):(0.1-0.5):(3-5), ultrasonically dispersed at a temperature of 50-60° C. for 2-3 h to obtain functionalized ethylene glycol, and then when a polymerization esterification rate of the antimony-free polyester reaches 85-90%, the functionalized ethylene glycol is added to an antimony-free polyester with the polymerization esterification rate of 85-90%, wherein a weight ratio of the functionalized ethylene glycol to synthetic raw material terephthalic acid of the antimony-free polyester is 35:65.

7. The method of preparing the antibacterial anti-yellowing ZnO antimony-free polyester fiber of claim 1, wherein process parameters of the direct spinning of the antimony-free polyester melt are: a spinning temperature of 270-295° C., a spinneret hole number of 12-48 holes, a cooling temperature of 20-25° C., a network pressure of 0.25-0.40 MPa, a first roller speed of 800-1000 m/min, a first roller temperature of 80-95° C., a second roller speed of 1300-2700 m/min, a second roller temperature of 125-140° C., a winding speed of 1220-2600 m/min.

8. The method of preparing the antibacterial anti-yellowing ZnO antimony-free polyester fiber of claim 1, wherein the antibacterial anti-yellowing ZnO antimony-free polyester fiber has an ammonia removal rate of greater than or equal to 92% after being placed in an environment with an ammonia concentration of 100 ppm for 2 hours; the antibacterial anti-yellowing ZnO antimony-free polyester fiber has an antibacterial rate of greater than or equal to 89% for *Escherichia coli*, an antibacterial rate of greater than or equal to 99% for *Staphylococcus aureus*, and an antibacterial rate of greater than or equal to 96% for *Candida albicans*; the antibacterial anti-yellowing ZnO antimony-free polyester fiber has a breaking strength of 3.5-3.7 cN/dtex and an elongation at break of 12.07-13.58%.

9. The method of preparing the antibacterial anti-yellowing ZnO antimony-free polyester fiber according to claim 2, wherein a preparation process of the anti-yellowing nano antibacterial agent is as follows: after dispersing the nano ZnO in a solvent, adding the phosphate ester small molecule with the thermal oxidative degradation resistance function to a solvent with dispersed nano ZnO at a temperature of 50-90° C., adjusting a pH value of a system to 4-5, keeping warm, cooling, refluxing, and stirring to react for 30-90 minutes, then cooling to room temperature, and then filtering, washing, and drying to obtain the anti-yellowing nano antibacterial agent; a content of the nano ZnO in the system is 1-5 wt %, and a content of the phosphate ester small molecule with the thermal oxidative degradation resistance function in the system is 1-6 wt %.

10. The method of preparing the antibacterial anti-yellowing ZnO antimony-free polyester fiber according to claim 3, wherein a preparation process of the anti-yellowing nano antibacterial agent is as follows: after dispersing the nano ZnO in a solvent, adding the phosphate ester small molecule with the thermal oxidative degradation resistance function to a solvent with dispersed nano ZnO at a temperature of 50-90° C., adjusting a pH value of a system to 4-5, keeping warm, cooling, refluxing, and stirring to react for 30-90 minutes, then cooling to room temperature, and then filtering, washing, and drying to obtain the anti-yellowing nano antibacterial agent; a content of the nano ZnO in the system is 1-5 wt %, and a content of the phosphate ester small molecule with the thermal oxidative degradation resistance function in the system is 1-6 wt %.

* * * * *